2,966,465

CADMIUM PYROPHOSPHATE PHOSPHOR

Richard C. Ropp, Towanda, Pa., assignor to Sylvania Electric Products Inc., Salem, Mass., a corporation of Delaware No Drawing. Filed Mar. 31, 1959, Ser. No. 803,103

9 Claims. (Cl. 252—301.6)

This invention relates to phosphors, and especially to cadmium pyrophosphate phosphors activated by manganese.

Such cadmium pyrophosphate phosphors have been previously known, but they were made by firing the ingredients in air, thereby oxidizing the manganese to the manganic or tetravalent state. The resultant phosphor gave fair response to cathode ray excitation, but only very weak response to the 2537 Angstrom unit excitation used in low pressure fluorescent lamps.

I have discovered, however, that if the phosphor is subsequently fired in a reducing atmosphere, which brings the manganese to the manganous or divalent state, the phosphor gives a bright red emission in response to 2537 A.U. excitation.

Although the final firing is done in a reducing atmosphere, the initial firing in air can be an important part of the process. If the initial firing in air is omitted, and the firing done directly in a moderately reducing atmosphere such as in a mixture of 20% hydrogen and 80% nitrogen, the result is generally a gray, discolored, non-fluorescent mass. However, when the raw materials necessary to form the phosphor are fired directly in a weaker reducing atmosphere, for example in an atmosphere with a smaller proportion of hydrogen, or in an atmosphere of ammonia, the initial firing in air can be omitted, but the results are not generally as good.

The reducing atmosphere may be a mixture of nitrogen and hydrogen, for example, as pointed out above, although other reducing atmospheres such as steam and hydrogen, ammonia or carbon monoxide, for example, can also be used. In the nitrogen-hydrogen mixture, the hydrogen does the reducing, and the nitrogen, being inert with respect to the phosphor components, merely slows up the reduction to the desired rate.

I have found, however, if the reducing atmosphere has a non-reducing component which is not inert but reacts with the phosphor, for example, if a reducing gas such as HCl is used, a wider variety of starting materials are effective. For example, tri-cadmium phosphate $$Cd_3(PO_4)_2:Mn$$

can be used, because the HCl gas will not only reduce the manganese, but will also combine with the excess cadmium, removing it as $CdCl_2$ and changing the tri-cadmium phosphate to the pyrophosphate. However, if the initial firing in air is omitted, and either tri-cadmium phosphate or cadmium pyrophosphate fired directly in HCl, the material will be converted to cadmium chlorophosphate and will not be a pyrophosphate. The result will be a phosphor, but one giving a less red emission color. The chlorophosphate has its emission peak at 5800 Angstrom units, whereas the pyrophosphate has a definitely different peak at 6200 Angstrom units. The tri-cadmium phosphate is very dull and has a wide emission band peaking at 6100 Angstrom units.

For the brightest phosphor, the phosphate component should be slightly above or equal to its stoichiometric value with respect to the cadmium, for example, about 1.04 moles of $P_2O_7$ for 2.00 moles of cadmium. If an excess of cadmium is used, the brightness drops rapidly, according to the amount of excess cadmium.

The amount of manganese can be between about 0.002 and 0.30 gram-atoms per two gram-atoms of cadmium, about 0.04 gram-atoms of manganese being an effective amounts, on that basis.

I have further discovered that phosphors giving a much redder emission can be made by replacing part of the cadmium by zinc or magnesium. Thus while cadmium pyrophosphate has its emission peak at 6200 Angstroms, cadmium zinc pyrophosphate has its peak at 6400 Angstroms, and cadmium magnesium phosphate at 6500 Angstroms.

The cadmium zinc and cadmium magnesium pyrophosphates have an unexpected property, in that they aid as converters of blue radiation to red, whereas the cadmium pyrophosphate without magnesium or zinc requires ultraviolet excitation, and is not excited by blue radiation.

All the above phosphors seem to be improved by including steam in the reducing atmosphere, for example by using steam and hydrogen.

Very effective results are obtained when the cadmium plus manganese, taken together, are stoichiometric with respect to the $P_2O_7$ radical component. For example, if 0.04 mole of manganese are used, and 2.00 moles of cadmium, then 1.04 moles of $P_2O_7$ would be desirable. Such a balance is achieved automatically if the cadmium and manganese in the starting mixture are both similar phosphate salts, for example if both are ammonium phosphates of their respective metals.

Manganese is not generally useful as a sole activator in phosphate phosphors, but the manganese used in testing my invention was of such high purity that no incidental activation by any other metal was possible. Manganese was the sole activator, and the addition of tin as a second activator did not give a good phosphor.

The table below shows results with different firing atmospheres.

Table I

| Phosphor | Atmosphere | | Structure | Lum. Color (2537 A. Excit.) | Relative Intensity of Red Radiation |
|---|---|---|---|---|---|
| | Prefiring | Refiring | | | |
| $Cd_3(PO_4)_{2.10}:Mn_{.04}$ | air | | $Cd_3(PO_4)_2$ | Dull pink | 10 |
| Do | $N_2$ | | do | do | 19 |
| Do | air | $N_2$ | $Cd_3(PO_4)_2$ | do | 15 |
| Do | air | HCl | $Cd_2P_2O_7$ | Bright red | 67 |
| $Cd_2(P_2O_7)_{1.04}:Mn_{.04}$ | air | | $Cd_2P_2O_7$ | Dull pink | 15 |
| Do | $N_2$ | | do | do | 9 |
| Do | air | air | $Cd_2P_2O_7$ | do | 20 |
| Do | air | HCl | do | Bright red | 52 |
| Do | air | $N_2$ | do | Dull pink | 22 |
| Do | air | $N_2$ and $H_2$ | do | Bright red | 51 |
| Do | air | Steam and $H_2$ | do | do | 85 |
| $Cd_2(P_2O_7)_{1.08}:Mn_{.08}$ | air | do | do | do | 100 |

It may be seen in Table I that both $Cd_3(PO_4)_2$:Mn and $Cd_2P_2O_7$:Mn have very poor response to 2537 A. excitation when prefired in air. If either $Cd_3(PO_4)_2$:Mn or $Cd_2P_2O_7$:Mn is refired in HCl, a bright red efficient phosphor having the Cd pyrophosphate structure results. If $Cd_2P_2O_7$:Mn is prefired in air and refired in a mixture of $N_2$ and $H_2$, the same bright red phosphor is obtained. At least part of the Mn activator must be in the manganous state if good response to 253 A. excitation is to be gained.

In preparing my new and improved phosphor, I prefer to use $CdNH_4PO_4$ and $MnNH_4PO_4$ to form the pyrophosphate. However, it is possible to use an ammonium phosphate combined with manganese or cadmium salts which break down upon heating to form the oxides. Also, Cd or Mn monobasic phosphates combined with Cd or Mn salts which form the oxides upon heating may also be used. Other combinations will occur to those skilled in the art.

The phosphors marked as being fired or refired in "air" in the above table were made using the ammonium phosphate raw material as mentioned above. The ammonia released on heating acted as a slightly reducing agent, and accounts for the "dull pink" emission. If no reducing gas were formed, there would be no appreciable emission.

The emission figures for excitation by 2537 A. system radiation given in the right-hand column of the table are linear relative to each other, but are given in arbitrary units.

The correct proportions of the various raw materials may be mixed by ball milling or hammermilling, or other suitable methods. After the mixture is prepared, it is fired at a temperature preferably between 1200° F. and 2000° F., but not limited to that range, to eliminate combined water and to form the pyrophosphate matrix containing Mn in the manganic or tetravalent state. The resulting powder has very poor response to 2537 A. excitation, but good cathode-ray response. The powder is then refired in a reducing atmosphere such as a mixture of $N_2$ and $H_2$ or in a HCl gas atmosphere. If the tribasic Cd phosphate formulation is used, the raw material mix is prefired as shown above to form the matrix containing Mn in the manganic state. The resulting powder is substantially non-responsive to 2537 A. irradiation. For refiring the tribasic Cd phosphate, the HCl gas atmosphere must be used. I prefer to use the pyrophosphate directly and to employ the $N_2$ and $H_2$ mixture as a reducing atmosphere for refiring.

In carrying out this second firing, the amount of reducing gas in the mixture must be adjusted to suit the firing time and firing temperature employed. Table II shows the effect of percent $H_2$ in the mixture and firing temperature on the phosphor.

Table II

| Time (Hrs.) | Temp. (° F.) | Percent $H_2$ | Physical Appearance of Phosphor | Relative sity of Red Radiation |
| --- | --- | --- | --- | --- |
| 1 | 1,800 | 20 | Soft | 56 |
| 1.5 | 1,800 | 20 | Slightly compact | 61 |
| 1 | 1,900 | 10 | Soft | 47 |
| 1.5 | 1,900 | 10 | Fused | 80 |
| 1 | 2,000 | 10 | Melted | 86 |
| 1 | 1,900 | 20 | Slightly compact | 78 |

In Table II it may be seen that either increasing the time or temperature causes fusion of the phosphor to take place. This fusion is undesirable in phosphors for use in fluorescent lamps.

The effect of manganese concentration on the 2537 A. response is shown in Table III.

Table III

| Mn (mols per mol pyrophosphate) | Relative Intensity of Red Radiation | | Ratio |
| --- | --- | --- | --- |
| | Prefired in air | Refired in $N_2$ and $H_2$ | |
| .01 | 4 | 32 | 8 |
| .02 | 5 | 52 | 10 |
| .04 | 3 | 69 | 23 |
| .08 | 5 | 90 | 18 |
| .10 | 8 | 92 | 12 |
| .14 | 10 | 92 | 9 |
| .20 | 12 | 90 | 8 |
| .30 | 13 | 49 | 4 |

It may be seen in Table III that there is a minimum gain of 300% in response to 2537 A. irradiation when phosphors are prepared according to the present invention. Yet there is but little difference in the cathode-ray response between the air-fired and refired phosphors, compared at the same Mn concentration.

The following specific examples are given of illustrative embodiments of the invention:

*Example 1.*—489.0 gms. of $CdNH_4PO_4$ having an assay of 92.2% as $CdNH_4PO_4$ and 14.355 gms. of $MnNH_4PO_4$ having an assay of 93.6% are hammermilled together. The resulting mixture is fired in an uncovered 7" crucible for 2 hrs. @ 1800° F.–1900° F. The prefired powder is essentially inert to 2537 A. light. It is rolled out, placed in a silica tray and refired for 1 hr. @ 1900° F. in a controlled reducing atmosphere containing 20% $H_2$ and 80% $N_2$. For example, the flow rates may be 8 l.p.m. of $N_2$ and 2 l.p.m. of $H_2$.

*Example 2.*—398.8 gms. of $Cd_2P_2O_7$ and 7.177 gms. of $MnNH_4PO_4$ having an assay of 93.6% as $MnNH_4PO_4$ are hammermilled together. This mixture is prefired for 2 hrs. @ 1800° F. in an open silica crucible. The resultant powder is rolled out, blended and refired in a silica tray in a tube furnace containing a controlled reducing atmosphere. The gas flow rates may be 8 l.p.m. of $N_2$ and 2 l.p.m. of $H_2$. The firing is carried out for 1 hour @ 1900° F.

*Example 3.*—489 gms. of $CdNH_4PO_4$ and 7.177 gms. of $MnNH_4PO_4$ are prefired similar to the procedure given in Example 1. The resultant powder is blended and refired in a muffle furnace having an ambient atmosphere of 1.5 l.p.m. of HCl gas. The firing time is ½ hr. @ 1460° F.

*Example 4.*—501.4 gms. of $CdNH_4PO_4$ (assay=92.6%) 115.6 gms. CdO, and 6.802 gms. of $MnNH_4PO_4$ (assay= 98.76% are hammermilled together. The resulting mix is prefired in an open crucible 45 min. @ 1800° F. The substantially inert powder is rolled out and blended. It is refired for ½ hr. @ 1460° F. in a tube furnace having an ambient atmosphere of 1.5 l.p.m. of HCl gas.

*Example 5.*—In the phosphors containing zinc or magnesium, I prefer to use cadmium ammonium phosphate, manganous ammonium phosphate, zinc ammonium phosphate and magnesium ammonium phosphate although other heat decomposible salts in combination may be used such as magnesium oxide or zinc oxide and diammonium phosphate.

The following ingredients are mixed together as fine powders:

425.9 gms. cadmium ammonium phosphate
10.1 gms. magnesium oxide
33.0 gms. diammonium phosphate
16.8 gms. manganous ammonium phosphate These components are blended together thoroughly in a hammermill and prefired in air 1.5 hrs. at 1800° F. The resulting cake is crushed, mixed well, and refired in an atmosphere of nitrogen and hydrogen or steam and hydrogen. The firing can be for 1.5 hrs. at 1900° F., using 10 l.p.m. of nitrogen with 4 l.p.m. of hydrogen, or 8 l.p.m. of hydrogen with the steam.

*Example 6*—The following ingredients are mixed as fine powders:

338.1 gms. cadmium ammonium phosphate
89.2 gms. zinc ammonium phosphate
17.7 gms. manganese ammonium phosphate Fire 1.5 hours at 1800° F. in 8 l.p.m. of nitrogen and 2 l.p.m. of hydrogen. For steam firing employ 8 l.p.m. of hydrogen, along with the steam. Steam firing seems to reduce the sintering action during the reduction step.

The above examples are illustrative. Various modifications can be made by a person skilled in the art without departing from the spirit and scope of the invention.

What I claim is:

1. A cadmium pyrophosphate phosphor activated by manganese in the manganous state.

2. A cadmium pyrophosphate phosphor activated by manganese in the manganous state, the amount of manganese present being between about 0.002 to about 0.30 atom per mole of cadmium pyrophosphate.

3. A cadmium pyrophosphate phosphor activated by manganese in the manganous state and in which the pyrophosphate radical is present in an amount above stoichiometric with respect to the cadmium.

4. The phosphor of claim 3, in which the amount of manganese present is between about 0.002 and 0.30 gram-atom per mole of cadmium pyrophosphate.

5. A cadmium pyrophosphate phosphor activated by manganese in the manganous state and in which the amount of cadmium plus manganese is about stoichiometric with respect to the pyrophosphate radical.

6. The phosphor of claim 5, in which the amount of manganese present is between about 0.002 and 0.30 gram-atom per mole of cadmium pyrophosphate.

7. The method of preparing a cadmium pyrophosphate phosphor activated by manganese in the manganous state, in which the ingredients necessary to form the phosphor are first fired in air, and then refired in a reducing atmosphere.

8. A cadmium zinc pyrophosphate phosphor activated by manganese in the manganous state.

9. A cadmium magnesium pyrophosphate phosphor activated by manganese in the manganous state.

References Cited in the file of this patent

UNITED STATES PATENTS

| | | |
|---|---|---|
| 2,463,449 | Williams | Mar. 1, 1949 |
| 2,605,227 | Fonda | July 29, 1952 |

FOREIGN PATENTS

| | | |
|---|---|---|
| 603,236 | Great Britain | June 11, 1948 |